United States Patent [19]

Shtrikman

[11] E Re. 29,019

[45] Reissued Oct. 26, 1976

[54] INTRUDER DETECTION SYSTEM

[75] Inventor: Shmuel Shtrikman, Rehovoth, Israel

[73] Assignee: Yeda Research & Development Co. Ltd., Rehovoth, Israel

[22] Filed: Aug. 20, 1975

[21] Appl. No.: 606,318

Related U.S. Patent Documents

Reissue of:

[64] Patent No.: 3,754,223
Issued: Aug. 21, 1973
Appl. No.: 8,755
Filed: Jan. 21, 1970

[30] Foreign Application Priority Data

Jan. 22, 1969 Israel ..... 31466

[52] U.S. Cl. ..... 340/258 C; 340/38 L
[51] Int. Cl.[2] ..... G08B 13/24
[58] Field of Search ..... 340/258 C, 258 R, 38 L, 340/282; 324/8, 41, 43; 343/788; 336/229

[56] References Cited

UNITED STATES PATENTS

| | | | |
|---|---|---|---|
| 1,992,214 | 2/1935 | Katz | 340/38 L |
| 2,201,146 | 5/1940 | Barker | 340/38 L |
| 2,212,986 | 8/1940 | Horni | 340/38 L |
| 2,492,182 | 12/1949 | Robinson | 340/38 L |
| 2,955,286 | 10/1960 | Klein | 343/788 |
| 2,976,483 | 3/1961 | Moore et al. | 324/43 |
| 2,981,950 | 4/1961 | Skidmore | 343/788 |
| 3,040,248 | 6/1962 | Geyger | 340/38 L |
| 3,068,448 | 12/1962 | Mountjoy et al. | 340/38 L |
| 3,140,475 | 7/1964 | Spencer et al. | 340/282 |
| 3,159,826 | 12/1964 | Morrison | 340/258 C |
| 3,355,707 | 11/1967 | Koerner | 324/41 X |
| 3,371,272 | 2/1968 | Stanton | 340/282 |
| 3,449,703 | 6/1969 | Steen | 336/229 X |
| 3,508,238 | 4/1970 | Baker | 340/258 C |
| 3,747,036 | 7/1973 | Erdmann | 324/41 |

FOREIGN PATENTS OR APPLICATIONS

| | | | |
|---|---|---|---|
| 464,880 | 5/1960 | Canada | 340/38 L |

*Primary Examiner*—Glen R. Swann, III
*Attorney, Agent, or Firm*—Weingarten, Maxham & Schurgin

[57] ABSTRACT

An intruder detection system comprising a line adapted to be located substantially at ground level and consisting of an elongated high permeability magnetic core on which is wound a coil in the form of successive sections of respectively opposite winding handednesses, a high gain low noise amplifier coupled to the line and a detector coupled to the amplifier and adapted to be coupled to an alarm system.

5 Claims, 4 Drawing Figures

Figure 1:
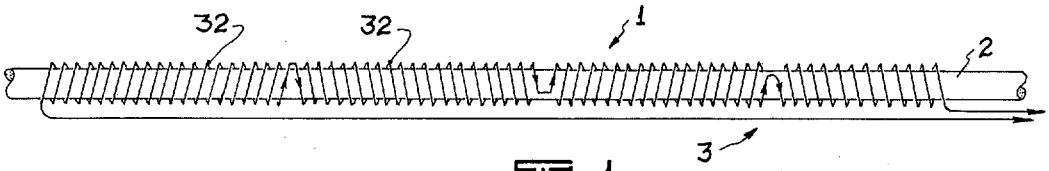

INVENTOR.
Shmuel Shtrikman
BY
Broudy and Neimark
Attorneys

INTRUDER DETECTION SYSTEM

Matter enclosed in heavy brackets [ ] appears in the original patent but forms no part of this reissue specification; matter printed in italics indicates the additions made by reissue.

The present invention relates to an intruder detection system and is particularly concerned with a system which is capable of detecting the entry of an intruder into a defined area whilst carrying a ferromagnetic object, such as, for example, house breaking tools, small arms or the like.

Various intruder detection systems have been proposed but in most cases the effectiveness of these known systems is limited by the fact that they are either complicated and therefore liable to fail or to be put out of action by the intruder or can lead to the production of false alarms, or that they are relatively difficult to install.

It is an object of the present invention to provide a new and improved detection system in which the above referred to disadvantages are substantially reduced.

According to the present invention there is provided an intruder detection system comprising a line adapted to be located substantially at ground level and consisting of an elongated high permeability magnetic core on which is wound a coil in the form of successive sections of respectively opposite winding handednesses, a high gain low noise amplifier coupled to the line and a detector coupled to the amplifier and adapted to be coupled to an alarm system.

The system in accordance with the present invention is based on the observed phenomenon that the presence of a ferromagnetic object is associated with an inhomogeneous magnetic field which arises out of the magnetic moment induced in the object by the earth's magnetic field and out of any inherent magnetic moment of the object itself. The magnitude of the induced magnetic moment of the ferromagnetic object is related to the size and shape of the object, its magnetic permeability and orientation. On the other hand, the magnitude of the earth's magnetic field is a more or less constant factor in these considerations having an intensity of about 0.6 gauss in a direction which mainly depends on the latitude of the location involved.

If now the ferromagnetic object moves, its associated field will also move and in consequence a fluctuation in the magnetic flux density will be observable during the movement at any point along the path of movement.

In the case of the present invention, this moving, inhomogeneous magnetic field associated with the object will be greatly enhanced and concentrated by the high permeability core and there will be induced in the various sections of the coil, electromotive forces which are cumulative along the length of the line and which result in the production of a detectable voltage across the coil leads. On the other hand, any change in the homogeneous field (e.g. fluctuations in the earth's magnetic field) will induce equal but opposite voltages in all the sections resulting in a substantially zero voltage across the coil leads.

Preferably the coil sections are of substantially equal length and numbers of turns, the section length being of the order of one meter in length.

Where a low impedance line is employed, in order to amplify the voltage signal appearing across the coil, which is of the order of nano volts, the line is coupled to an amplifier via a suitable transformer which is matched to the low impedance of the line. The output of the amplifier is fed to an appropriate discriminator circuit such as for example a threshold detector by means of which unwanted signals are rejected. The output of the discriminator can then be coupled to an appropriate alarm system which can be visual or audible.

Figure 2:
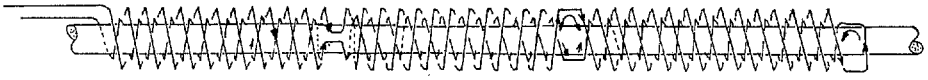
Figure 3:
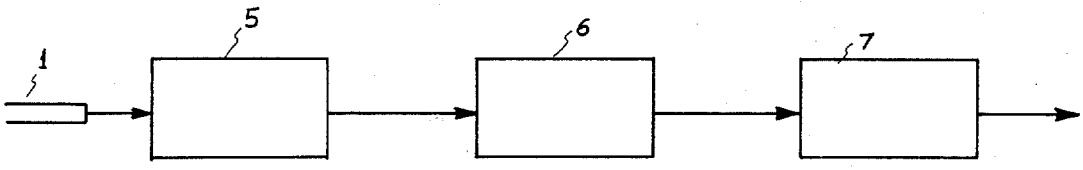
Figure 4:
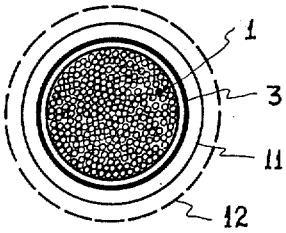

For better understanding of the present invention and to show how the same can be carried out in practice reference will now be made to the accompanying drawings in which FIGS. 1 and 2 are schematic representations of three forms of lines in accordance with the present invention, FIG. 3 is a schematic circuit block diagram of the intruder detection system in accordance with the invention, and FIG. 4 is a schematic cross sectional representation of a line in accordance with the present invention.

FIG. 1 shows schematically a line 1 consisting of a ferromagnetic core 2 along the length of which is wound a coil 3. The coil 3 is wound in the form of successive, single-layer, sections 3a of respectively opposite winding handednesses. In the embodiment shown in FIG. 1 of the drawings seeing that both ends of the coil 3 are to emerge from the same end of the line one return lead of the coil extends over the whole wound length thereof. Alternatively, said one terminal lead can be made to extend through the core.

In the embodiment shown in FIG. 2 of the drawings the coil is rewound on itself in such a way that the two ends of the coil emerge from one end of the line. In this way a multilayer coil can be obtained. The constituent layers of each section can be successive right and left handed in which case the successive layers are connected in series. Where however successive sections are to be connected in parallel then the successive constituent layers of each section form like-handed windings, the handedness alternating from section to section.

As seen schematically in FIG. 3 the output from the line 1 is fed to a transformer which serves to impedance match the line 1 with a subsequent amplifier 6. For this purpose a step up transformer 5 is employed. Since the signal frequency to be detected is in the cycle per second range (e.g. between 0.3 – 3 Hz) a magnetically shielded transformer having a step up ratio of (for example) 1 to 50 and a primary winding of (for example) 100 Henry is employed. The output of the transformer 5 is fed to the amplifier which has an input impedance of several megohms in the above signal frequency range and has a noise characteristic of less than one micro volt. The output of the amplifier 6 is fed to a discriminator 7 whose purpose is to discriminate between signals whose voltage lies above or below a certain minimum value. The output of the discriminator 7 is fed to a suitable alarm system which can be audio, visual or the like.

With an arrangement as described above an extreme situation can be envisaged wherein the ferromagnetic object, behaving as a magnetic dipole, moves in the plane which is always parallel to itself and normal to the line. In such an extreme situation the signal strength arising out of the passage of a ferromagnetic object in the vicinity of the line has a maximum value when this object passes between two successive sections and a theoretically zero value when the object passes the mid point of any specific section. In order to ensure that a detectable signal is obtained even under these extreme circumstances when the object passes the mid point of a section, an arrangement can be employed wherein two essentially separate independent coils are employed wound one on the other each coil being similar to that described with reference to FIG. 2, the two coils being shifted with respect to each other by half a section and being connected respectively via separate transformers and amplifiers to separate displays. With such an arrangement and even under the extreme circumstances referred to above when an object passes in the mid point of any specific section a detectable signal will be obtained at least in one of the displays.

In one particular example of a flexible line (shown schematically in FIG. 4 of the drawings) the core 1 consists of a considerable number (e.g. 7×19) of numetal wires of 0.2 mm diameter. A double layer coil winding consisting of enamel insulated copper wire of 0.5 mm diameter is wound on the core in the form of sections of successively opposite winding handednesses. Each section is 700 mm in length and in consequence each section includes about 1400 turns. With such a line having a length of 100 metres the overall resistance is about 400 ohms. In order to ensure a good electrical insulation between the core and the winding and between the two layers of winding a thin nylon insulating layer, not shown, (0.05 mm thickness) can be wound on the core and between the windings. The windings are encased in a copper braiding shield 11 which is in its turn located within an outer plastic envelope 12 and in this way moisture is prevented from entering the line.

It will be appreciated that other materials can be employed for the magnetic core and conductive windings and other dimensions can be used.

Furthermore, whilst in the arrangement shown in FIG. 2 of the drawings a second winding is interposed between successive sections of a first winding this second winding can be superimposed on the first winding but shifted with respect thereto.

An intruder detection system including a line (preferably flexible) in accordance with the present invention enjoys the distinct advantage that the line which can be of small diameter can be rapidly and simply buried in a single narrow trench even in difficult terrain. Such a single line can be effectively protective against damage, e.g. by rodents by enclosing it in a pipe, e.g. an aluminum irrigation pipe. The same trench in which the line is laid can also serve to accommodate the leads to and from the line. Thus a plurality of successive lines (each e.g. being about 200 m in length) can be coupled by means of these leads to the respective electronic units which can all be located in a single control post.

I claim:

1. A passive line for an intruder detection system operable in the earth's magnetic field, comprising:

a. a plurality of elongated high-permeability wires arranged in lengthwise contact to define a flexible high-permeability magnetic core un-magnetized except for the effect thereon of the earth's magnetic field, the cross-section of the wires being very much smaller than the cross-section of the core; and b. a coil wound on the core having at least one layer of insulated conductor wound on the core in the form of many successive lengthwise serially connected sections of respectively opposite-winding handedness, the sections being of substantially equal length and homogeneously wound.

2. An intruder detection system using the line of claim 1 comprising a high-gain, low-noise amplifier, and an impedance matching transformer coupling the line to the amplifier for detecting transient inhomogeneous magnetic fields in the vicinity of the line.

3. A line according to claim 1 including:

a. a shield of braided metal encasing the coil and core to effect flexing of the line; and b. an outer plastic envelope encasing the shield for waterproofing the line.

4. A passive line for an intruder detection system operable in the earth's magnetic field, comprising:

a. a plurality of elongated high-permeability wires arranged in lengthwise contact to define a flexible high-permeability magnetic core un-magnetized except for the effect thereon of the earth's magnetic field, the cross-section of the wires being very much smaller than the cross-section of the core;

b. a coil wound on the core having at least one layer of insulated conductor wound on the core in the form of many successive lengthwise serially connected sections of respectively opposite-winding handedness, the sections being of substantially equal length and homogeneously wound; and c. a second coil wound on the core and comprising at least one layer of insulated conductor wound on the first mentioned coil in the form of successive lengthwise sections of respectively opposite handedness, the sections of one coil being shifted lengthwise by about a half a section with respect to the sections of the other coil.

5. A passive line for an intruder detection system operable in the earth's magnetic field, comprising:

a. a plurality of elongated high-permeability wires arranged in lengthwise contact to define a flexible high-permeability magnetic core un-magnetized except for the effect thereon of the earth's magnetic field, the cross-section of the wires being very much smaller than the cross-section of the core; and b. a coil wound on the core having at least one layer of insulated conductor wound on the core in the form of many successive lengthwise serially connected sections of respectively opposite-winding handedness, the sections being of substantially equal length and homogeneously wound;

c. said coil comprising a plurality of layers of conductors, overlying sections in different layers having the same winding handedness.

* * * * *